United States Patent
Loveless et al.

(10) Patent No.: US 8,720,569 B2
(45) Date of Patent: May 13, 2014

(54) IODIDE STABILIZER FOR VISCOSIFIED FLUID CONTAINING IRON

(75) Inventors: David Michael Loveless, Duncan, OK (US); Lucas Kurtis Fontenelle, Duncan, OK (US); Rajesh Kumar Saini, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 191 days.

(21) Appl. No.: 13/341,351

(22) Filed: Dec. 30, 2011

(65) Prior Publication Data

US 2013/0168095 A1    Jul. 4, 2013

(51) Int. Cl.
*E21B 43/25* (2006.01)
*E21B 43/26* (2006.01)
*E21B 43/267* (2006.01)
*C09K 8/60* (2006.01)
*C09K 8/68* (2006.01)

(52) U.S. Cl.
USPC .......... 166/300; 166/305.1; 166/308.2; 166/308.3; 166/308.5; 507/211; 507/212; 507/213; 507/214; 507/277; 507/922

(58) Field of Classification Search
None
See application file for complete search history.

(56) References Cited

U.S. PATENT DOCUMENTS

| | | | | |
|---|---|---|---|---|
| 3,779,914 A | * | 12/1973 | Nimerick | 507/211 |
| 5,054,552 A | * | 10/1991 | Hall et al. | 166/278 |
| 5,674,817 A | | 10/1997 | Brezinski et al. | |
| 6,060,435 A | * | 5/2000 | Beard et al. | 507/258 |
| 7,165,617 B2 | * | 1/2007 | Lord et al. | 166/308.5 |
| 7,299,876 B2 | * | 11/2007 | Lord et al. | 166/308.5 |
| 2006/0032636 A1 | * | 2/2006 | Lord et al. | 166/308.2 |
| 2006/0116296 A1 | * | 6/2006 | Kippie et al. | 507/244 |
| 2006/0247135 A1 | * | 11/2006 | Welton et al. | 507/213 |

\* cited by examiner

*Primary Examiner* — George Suchfield
(74) *Attorney, Agent, or Firm* — Craig Roddy; Booth Albanesi Schroeder, LLC (57) ABSTRACT

A composition of a treatment fluid and method for treating a zone of well. In an embodiment, the composition includes at least: (i) an aqueous phase; (ii) at least 5 ppm iron ion in the aqueous phase; (iii) a source of at least 5 ppm iodide ion to be dissolved in the aqueous phase; (iv) a water-soluble viscosity-increasing agent dissolved in the aqueous phase; and (v) a source of an oxidative breaker to be dissolved in the aqueous phase. In an embodiment, a method of treating a zone of a subterranean formation of a well includes at least the steps of: (a) forming a treatment fluid according to the composition; and (b) introducing the treatment fluid into the zone.

17 Claims, 4 Drawing Sheets

IODIDE STABILIZER FOR VISCOSIFIED FLUID CONTAINING IRON

TECHNICAL FIELD

The inventions are in the field of producing crude oil or natural gas from subterranean formations. More specifically, the inventions generally relate to compositions and methods for stabilizing the viscosity of a treatment fluid having or developing during use a high concentration of iron ions in an aqueous phase that may undesirably catalyze an oxidizer for breakage of the viscosity increasing polymer.

BACKGROUND ART

Oil & Gas Wells

In the context of production from a well, oil and gas are understood to refer to crude oil and natural gas. Oil and gas are naturally occurring hydrocarbons in certain subterranean formations.

A subterranean formation is a body of rock that has sufficiently distinctive characteristics and is sufficiently continuous for geologists to describe, map, and name it.

A subterranean formation containing oil or gas is sometimes referred to as a reservoir. A reservoir is a subsurface rock body in which oil or gas is present. A reservoir may be located under land or under the seabed off shore. Oil and gas reservoirs are typically located in the range of a few hundred feet (shallow reservoirs) to a few tens of thousands of feet (ultra-deep reservoirs) below the surface of the land or seabed.

To produce oil or gas from a reservoir, a well is drilled into a subterranean formation, which may be the reservoir or adjacent to the reservoir. A well includes a wellhead and at least one wellbore from the wellhead penetrating the earth. Typically, a wellbore must be drilled hundreds or thousands of feet into the earth to reach a hydrocarbon-bearing formation. Generally, the greater the depth of the formation, the higher the "static" temperature and pressure of the formation.

The wellbore refers to the drilled hole, including any cased or uncased portions of the well. The borehole usually refers to the inside wellbore wall, that is, the rock face or wall that bounds the drilled hole. A wellbore can have portions that are vertical, horizontal, or anything in between, and it can have portions that are straight, curved, or branched. The wellhead is the surface termination of a wellbore, which surface may be on land or on a seabed. As used herein, "uphole," "downhole," and similar terms are relative to the direction of the wellhead, regardless of whether a wellbore portion is vertical or horizontal.

A wellbore can be used as a production or injection wellbore. A production wellbore is used to produce oil or gas from the reservoir. An injection wellbore is used to inject a fluid, e.g., liquid water or steam, to drive oil or gas to a production wellbore.

Broadly, a zone refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." As used herein, a "treatment zone" refers to an interval of rock along a wellbore into which a well fluid is directed to flow from the wellbore.

Well Servicing and Well Fluids

Generally, well services include a wide variety of operations that may be performed in oil, gas, geothermal, or water wells, such as drilling, cementing, completion, and intervention. These well services are designed to facilitate or enhance the production of desirable fluids such as oil or gas from or through a subterranean formation.

A well service usually involves introducing a well fluid into a well. As used herein, a "well fluid" is a fluid used in a well service. As used herein, a "well fluid" broadly refers to any fluid adapted to be introduced into a well for any purpose. A well fluid can be, for example, a drilling fluid, a cementing composition, a treatment fluid, or a spacer fluid.

Common Well Treatments and Treatment Fluids

Well services can include various types of treatments that are commonly performed in a wellbore or subterranean formation. As used herein, the word "treatment" refers to any treatment for changing a condition of a portion of a wellbore or an adjacent subterranean formation; however, the word "treatment" does not necessarily imply any particular treatment purpose.

A treatment usually involves introducing a treatment fluid into a well. As used herein, a "treatment fluid" is a fluid used in a treatment. Unless the context otherwise requires, the word "treatment" in the term "treatment fluid" does not necessarily imply any particular treatment or action by the fluid. If a treatment fluid is to be used in a relatively small volume, for example less than about 200 barrels (32 m$^3$), it is sometimes referred to in the art as a wash, dump, slug, or pill.

For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production, and controlling sand or fines production. Still other types of completion or intervention treatments include, but are not limited to, damage removal, formation isolation, wellbore cleanout, scale removal, and scale control. Of course, other well treatments and treatment fluids are known in the art.

Hydraulic Fracturing

Hydraulic fracturing is a common stimulation treatment. The purpose of a fracturing treatment is to provide an improved flow path for oil or gas to flow from the hydrocarbon-bearing formation to the wellbore. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

Fracturing a subterranean formation often uses hundreds of thousands of gallons of fracturing fluid or more. Further, it is often desirable to fracture more than one treatment zone of a well. Thus, a high volume of fracturing fluids is often used in fracturing of a well, which means that a low-cost fracturing fluid is desirable. Because of the ready availability and relative low cost of water compared to other liquids, among other considerations, a fracturing fluid is usually water-based.

Proppant for Hydraulic Fracturing

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. See, for example, McGuire and Sikora, 1960. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity. In shale fracturing, for example, small proppant, e.g., about 100 mesh size is commonly used, whereas in more permeable formations 20/40 mesh size is commonly used.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm). (The next smaller particle size class below sand sized is silt, which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

Suitable proppant materials include, but are not limited to, sand (silica), ground nut shells or fruit pits, sintered bauxite, glass, plastics, ceramic materials, processed wood, resin coated sand or ground nut shells or fruit pits or other composites, and any combination of the foregoing. Mixtures of different kinds or sizes of proppant can be used as well. In conventional reservoirs, if sand is used, it commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in a fracturing fluid depends on the nature of the subterranean formation. As the nature of subterranean formations differs widely, the concentration of proppant in the fracturing fluid may be in the range of from about 0.03 kilograms to about 12 kilograms of proppant per liter of liquid phase (from about 0.1 lb/gal to about 25 lb/gal).

Coated Proppant for Hydraulic Fracturing

One common problem is that the proppant may not be sufficiently strong by itself to prop open a fracture. Another common problem is that the surface of the proppant may have an undesirable wettability characteristic for producing oil or gas from a particular subterranean formation. Another common problem is that, as the oil or gas moves through the subterranean formation, it can dislodge and carry particulate with the fluid into the wellbore. The migration of this particulate can plug pores in the formation or proppant pack, decreasing production, in addition to causing abrasive damage to wellbore pumps, tubing, and other equipment.

To help alleviate some of the common problems mentioned above, a resinous material can be coated on the proppant. The term "coated" does not imply any particular degree of coverage on the proppant particulates, which coverage can be partial or complete.

As used herein, the term "resinous material" means a material that is a viscous liquid and has a sticky or tacky characteristic when tested under standard laboratory conditions. A resinous material can include a resin, a tackifying agent, and any combination thereof in any proportion. The resin can be or include a curable resin.

Designing a Fracturing Treatment for a Treatment Zone

Designing a fracturing treatment usually includes determining a designed total pumping time for the treatment or determining a designed total pumping volume of fracturing fluid for the fracturing treatment. The tail end of a fracturing treatment is the last portion of pumping time into the zone or the last portion of the volume of fracturing fluid pumped into the zone. This is usually about the last minute of total pumping time or about the last wellbore volume of a fracturing fluid to be pumped into the zone. The portion of pumping time or fracturing fluid volume that is pumped before the tail end of a fracturing fluid reaches into a far-field region of the zone. In addition to being designed in advance, the actual point at which a fracturing fluid is diverted from a zone can be determined by a person of skill in the art, including based on observed changes in well pressures or flow rates.

Fracturing methods can include a step of designing or determining a fracturing treatment for a treatment zone of the subterranean formation prior to performing the fracturing treatment. For example, the step of designing can include: (a) determining the design temperature and design pressure; (b) determining the total designed pumping volume of the one or more treatment fluids to be pumped into the treatment zone at a rate and pressure above the fracture pressure of the treatment zone; (c) designing a treatment fluid, including its composition and rheological characteristics; (d) designing the pH of the continuous phase of the treatment fluid, if water-based; (e) determining the size of a proppant of a proppant pack previously formed or to be formed in fractures in the treatment zone; and (f) designing the loading of any proppant in the fluid.

"Carrier" Fluid for Suspending Particulate, Such as Cuttings, Proppant, or Gravel A well fluid can be adapted to be a "carrier" fluid for a particulate.

For example, during drilling, rock cuttings should be carried uphole by the drilling fluid and flowed out of the wellbore. The rock cuttings typically have specific gravity greater than 2, which is much higher than that of many drilling fluids. These high-density cuttings have a tendency to separate from water or oil very rapidly.

Similarly, a proppant used in fracturing or a gravel used in gravel packing may have a much different density than the carrier fluid. For example, sand has a specific gravity of about 2.7, whereas water has a specific gravity of 1.0 at Standard Laboratory conditions of temperature and pressure. A proppant or gravel having a different density than water will tend to separate from water very rapidly.

As many well fluids are water-based, partly for the purpose of helping to suspend particulate of higher density, and for other reasons known in the art, the density of the fluid used in a well can be increased by including highly water-soluble salts in the water, such as potassium chloride. However, increasing the density of a well fluid will rarely be sufficient to match the density of the particulate.

Increasing Viscosity of Fluid for Suspending Particulate

Increasing the viscosity of a well fluid can help prevent a particulate having a different specific gravity than an external phase of the fluid from quickly separating out of the external phase.

A viscosity-increasing agent can be used to increase the ability of a fluid to suspend and carry a particulate material in a well fluid. A viscosity-increasing agent can be used for other purposes, such as matrix diversion or conformance control.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents and related techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser amount of the viscosity-increasing agent in order to achieve the desired fluid viscosity in a large volume of fracturing fluid.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Water-Soluble Polymers for Increasing Viscosity of Aqueous Phase

Treatment fluids used in high volumes, such as fracturing fluids, are usually water-based. Efficient and inexpensive viscosity-increasing agents for water include certain classes of water-soluble polymers.

As will be appreciated by a person of skill in the art, the dispersability or solubility in water of a certain kind of polymeric material may be dependent on the salinity or pH of the water. Accordingly, the salinity or pH of the water can be modified to facilitate the dispersability or solubility of the water-soluble polymer. In some cases, the water-soluble polymer can be mixed with a surfactant to facilitate its dispersability or solubility in the water or salt solution utilized.

The water-soluble polymer can have an average molecular weight in the range of from about 50,000 to 20,000,000, most preferably from about 100,000 to about 4,000,000. For example, guar polymer is believed to have a molecular weight in the range of about 2 to about 4 million.

Typical water-soluble polymers used in well treatments include water-soluble polysaccharides and water-soluble synthetic polymers (e.g., polyacrylamide). The most common water-soluble polysaccharides employed in well treatments are guar and its derivatives.

Polysaccharides and Derivatives

As used herein, a "polysaccharide" can broadly include a modified or derivative polysaccharide.

As used herein, "modified" or "derivative" means a compound or substance formed by a chemical process from a parent compound or substance, wherein the chemical skeleton of the parent is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

Single- or Multi-Chain Polymers

A polymer can be classified as being single chain or multi chain, based on its solution structure in aqueous liquid media. Examples of single-chain polysaccharides that are commonly used in the oilfield industry include guar, guar derivatives, and cellulose derivatives. Guar polymer, which is derived from the beans of a guar plant, is referred to chemically as a galactomannan gum. Examples of multi-chain polysaccharides include xanthan, diutan, and scleroglucan, and derivatives of any of these. Without being limited by any theory, it is currently believed that the multi-chain polysaccharides have a solution structure similar to a helix or are otherwise intertwined.

Form and Concentration of Viscosity-Increasing Agent

The viscosity-increasing agent may be provided in any form that is suitable for the particular treatment fluid or application of the present invention. The viscosity-increasing agent can be provided as a liquid, gel, suspension, or solid additive that is admixed or incorporated into a treatment fluid used in conjunction with the present invention. The viscosity-increasing agent can also be present in a solid particulate form of any size or shape. For example, larger sized particulates of spherical shape can be used, inter alia, to form perforation tunnel blocking particles, similar to perforation pack balls. Similarly, smaller sized particulates can be used, inter alia, as a fluid-loss control material that may act to bridge natural fractures or other channels.

The viscosity-increasing agent should be present in a treatment fluid in a form and in an amount at least sufficient to impart the desired viscosity to a treatment fluid. For example, the amount of viscosity-increasing agent used in the treatment fluids suitable for use in the present invention may vary from about 0.25 pounds per 1,000 gallons of treatment fluid ("lbs/Mgal") to about 200 lbs/Mgal. In other embodiments, the amount of viscosity-increasing agent included in the treatment fluids suitable for use in the present invention may vary from about 10 lbs/Mgal to about 80 lbs/Mgal. In another embodiment, about 20 pounds to about 70 pounds (lbs) of water-soluble polymer per 1,000 gallons (Mgal) of water (equivalent to about 2.4 g/L to about 8.4 g/L).

Crosslinking of Polymer to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

A "base gel" is a term used in the field for a fluid that includes a viscosity-increasing agent, such as guar, but that excludes crosslinking agents. Typically, a base gel is a fluid that is mixed with another fluid containing a crosslinker, wherein the mixed fluid is adapted to form a gel. A base gel can be used, for example, as an external phase of an emulsion.

For example, one of the most common viscosity-increasing agents used in the oil and gas industry is guar. A mixture of guar dissolved in water forms a base gel, and a suitable crosslinking agent can be added to form a much more viscous fluid, which is then called a crosslinked fluid. The viscosity of base gels of guar is typically about 20 to about 50 cp. When a base gel is crosslinked, the viscosity is increased by 2 to 100 times depending on the temperature, the type of viscosity testing equipment and method, and the type of crosslinker used.

The degree of crosslinking depends on the type of viscosity-increasing polymer used, the type of crosslinker, concentrations, temperature of the fluid, etc. Shear is usually required to mix the base gel and the crosslinking agent. Thus, the actual number of crosslinks that are possible and that actually form also depends on the shear level of the system. The exact number of crosslink sites is not well known, but it could be as few as one to about ten per polymer molecule. The number of crosslinks is believed to significantly alter fluid viscosity.

For a polymeric viscosity-increasing agent, any crosslinking agent that is suitable for crosslinking the chosen monomers or polymers may be used.

Some crosslinking agents form substantially permanent crosslinks with viscosity-increasing polymer molecules. Such crosslinking agents include, for example, crosslinking agents comprising at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof.

Crosslinking agents can include a crosslinking agent composition that may produce delayed crosslinking of an aqueous solution of a crosslinkable organic polymer, as described in U.S. Pat. No. 4,797,216, the entire disclosure of which is incorporated herein by reference. Crosslinking agents can include a crosslinking agent composition that may comprises a zirconium compound having a valence of +4, an alpha-hydroxy acid, and an amine compound as described in U.S. Pat. No. 4,460,751, the entire disclosure of which is incorporated herein by reference.

Some crosslinking agents do not form substantially permanent crosslinks, but rather chemically labile crosslinks with viscosity-increasing polymer molecules. For example, a guar-based gelling agent that has been crosslinked with a borate-based crosslinking agent does not form permanent cross-links.

Sometimes, however, crosslinking is undesirable, as it may cause the polymeric material to be more difficult to break and it may leave an undesirable residue in the formation.

Breaker for Viscosity of Fluid with Polysaccharide or Crosslinked Polysaccharide After a treatment fluid is placed where desired in the well and for the desired time, the fluid usually must be removed from the wellbore or the formation. For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified fluid is referred to as "breaking" the fluid. Chemicals used to reduce the viscosity of fracturing fluids are called breakers. Other types of viscosified well fluids also need to be broken for removal from the wellbore or subterranean formation.

No particular mechanism is necessarily implied by the term. For example, a breaker can reduce the molecular weight of a water-soluble polymer by cutting the long polymer chain. As the length of the polymer chain is cut, the viscosity of the fluid is reduced. For instance, reducing the guar polymer molecular weight to shorter chains having a molecular weight of about 10,000 converts the fluid to near water-thin viscosity. This process can occur independently of any crosslinking bonds existing between polymer chains.

In the case of a crosslinked viscosity-increasing agent, for example, one way to diminish the viscosity is by breaking the crosslinks. For example, the borate crosslinks in a borate-crosslinked polymer can be broken by lowering the pH of the fluid. At a pH above 8, the borate ion exists and is available to crosslink and cause an increase in viscosity or gelling. At a lower pH, the borate ion reacts with proton and is not available for crosslinking, thus, an increase in viscosity due to borate crosslinking is reversible. In contrast, crosslinks formed by zirconium, titanium, antimony, and aluminum compounds, however, are such crosslinks are considered to be non-reversible and are broken by other methods than controlling pH.

Thus, removal of the treatment fluid is facilitated by using one or more breakers to reduce fluid viscosity.

Unfortunately, another complicating factor exists. Because of the large size of the polymer, a filtration process can occur upon the face of a formation or fracture in conventional formation. A filtercake of the polymer can be formed while the aqueous fluid, KCl, and breakers pass into the matrix of the formation. Careful examination of this filtercake, which may be formed from crosslinked or uncrosslinked guar or other polymer, reveals a semi-elastic, rubberlike membrane. Once the polymer concentrates, it is difficult to solubilize the polymer. Nonfiltercake fluid consists of approximately 99.5 percent water and 0.5 percent polymer. Accordingly, for example, when the fracture closes in a fracturing treatment, the permeability of the proppant bed or the formation face may be severely damaged by the polymer filtercake. Viscosified gravel pack fluids need breakers, too. They may or may not form a filtercake on the formation face.

Breakers must be selected to meet the needs of each situation. First, it is important to understand the general performance criteria of breakers. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid viscosity at reservoir temperature. A typical gravel pack break criteria is a minimum 4-8 hour break time. On the other hand, long break times, especially if greater than two days, are undesirable.

Chemical breakers used to reduce viscosity of a fluid viscosified with a viscosifying polymer used in fracturing or other subterranean applications are generally grouped into three classes: oxidizers, enzymes, and acids. In general, the breakers operate by cleaving the backbone of polymer either by hydrolysis of acetyl group, cleavage of glycosidic bonds, oxidative/reductive cleavage, free radical breakage or combination of these processes. A breaker should be selected based on its performance in the temperature, pH, time, and desired viscosity profile for each specific treatment.

Oxidizer Breakers

Oxidizers commonly used to reduce viscosity of natural polymers includes, for example, sodium persulfate, potassium persulfate, ammonium persulfate, lithium or sodium hypochlorites, chlorites, peroxide sources (sodium perborate, sodium percarbonate, calcium percarbonate, urea-hydrogen peroxide, hydrogen peroxide, etc.), bromates, periodates, permanganates, etc. In these types of breakers, oxidation reduction chemical reactions occur as the polymer chain is broken.

Different oxidizers are selected based on their performance at different temperature and pH ranges. Consideration is also given to the rate of oxidation at a particular temperature and pH range. For example, the rate at which a persulfate molecule breaks into two radicals is temperature dependent. Below 120° F. (49° C.) this process occurs very slowly, and the reaction can be catalyzed to obtain acceptable break rates. A variety of catalysts, including various organic amines, can be used for persulfate breakers. The optimum pH for persulfate oxidation is around 10 at low temperature (less than 150° F. or 66° C.). Above approximately 200° F. (93° C.), persulfate decomposes very quickly and breaks the polymer very quickly (i.e., with little delay in the break). Therefore, persulfate is generally not recommended as a breaker above about 200° F. Similarly chlorites are used for high temperature breakage in the range of about 150° F. to about 350° F. with optimum pH range of 6-12. Some breakers can also be activated by catalysts such as cobalt acetate, EDTA, NTA, etc. to function at different temperature ranges. Hypochlorites are generally used for low temperature breakage of natural polymers.

Controlling Break Time

A breaker may be included in a treatment fluid in a form and concentration at selected to achieve the desired viscosity reduction at a desired time.

The breaker may be formulated to provide a delayed break, if desired. For example, a suitable breaker may be encapsulated if desired. Suitable encapsulation methods are known to those skilled in the art. One suitable encapsulation method involves coating the selected breaker in a porous material that allows for release of the breaker at a controlled rate. Another suitable encapsulation method that may be used involves coating the chosen breakers with a material that will degrade when downhole so as to release the breaker when desired. Resins that may be suitable include, but are not limited to, polymeric materials that will degrade when downhole.

A treatment fluid can optionally comprise an activator or a retarder to, among other things, optimize the break rate provided by a breaker. Examples of such activators include, but are not limited to, acid generating materials, chelated iron, copper, cobalt, and reducing sugars. Examples of retarders include sodium thiosulfate, methanol, and diethylenetriamine.

Delayed breakers, activators, and retarders can be used to help control the breaking of a fluid, but these may add additional complexity and cost to the design of a treatment fluid.

Potential Sources of Water for Use in Treatment Fluids

Non-freshwater sources of water can include surface water ranging from brackish water to seawater, brine, returned water (sometimes referred to as flowback water) from the delivery of a well fluid into a well, unused well fluid, and produced water. As used herein, brine refers to a water having at least 40,000 mg/L total dissolved solids.

In the production of oil and gas, great quantities of water are produced. Sources of produced water can include water that may have been introduced into the subterranean formation as part of a well-completion or well-treatment process, water that may have been delivered as part of an injection-well driving process, formation water, and any mixture of any of these. For example, for every barrel of oil produced from a well, it is typical to also obtain about 10 barrels of produced water. Large quantities of produced water continue to be disposed of as wastewater, for example, by re-injecting the produced water into a well.

With the rising demand for potable water and freshwater, increasing public concern for the environment, and with the rising costs of obtaining potable water and freshwater, it would be desirable to be able to use lower quality water, such as returned water and produced water, in well treatments.

Unfortunately, unused well fluid, returned water, and produced water often has high concentrations of total dissolved solids (salts), and may have TDS levels of brackish water, seawater, or brine. Returned water and produced water may also contain hydrocarbon and other materials. For example, in addition to dissolved and suspended solids, produced water may also contain residual oil, grease, and production chemicals. A production chemical is a chemical that was introduced into the subterranean formation in a prior well treatment and may be found in subsequently produced water. An example of a production chemical would include residual viscosity-increasing agent, including, for example, non-crosslinked or crosslinked polysaccharides.

It is recognized that, in general, for water to be suitable for use in common well treatments, usually all that is required is that the water does not contain one or more materials that would be particularly detrimental to the chemistry involved in such well treatments.

For example, the water is preferably cleaned of undissolved, suspended solids (e.g., silt) to a point that the natural permeability and the conductivity of the fracture will not be damaged. For this purpose, all the water used in a well treatment may be filtered to help reduce the concentration of suspended, undissolved solids that may be present in the water, such as silt.

In some cases, a returned water (aka flow back water) can have an undesirably high viscosity due to a residual viscosity-increasing polymer, which may or may not be cross-linked, that was not completely broken in the well before flowing back. To use such a returned water in forming another well fluid, it may be necessary to break the residual viscosity.

Further, it is recognized that it is even possible to use such water having undesirable concentrations of certain ions or TDS if the water is used as part of the treatment fluid, and the treatment fluid is formed in using the water in a proper sequence.

Of particular concern for use in common well treatment is the avoidance of water containing undesirably-high concentrations of inorganic ions having a valence state of two or more. As is well known in the oil and gas industry, such ions can interfere with the chemistry of forming or breaking certain types of viscous fluids that are commonly used in various well treatments.

Cations that are of common concern include dissolved alkaline earth metal ions, particularly calcium and magnesium ions, and may include dissolved iron(II) or iron(III) ions. Even at higher pH ranges, ferric ion can be dissolved itself or as part of a water-soluble complexes with many inorganic and organic ligands, including compounds that are the byproducts of the biodegradation of aromatic petroleum hydrocarbons.

An anion of common concern includes sulfate.

Normally, however, a high concentration of both calcium ions and sulfate anions in a water source is unlikely. Calcium ions tend to react with sulfate ions to produce calcium sulfate, which is an insoluble salt [0.21 g/100 ml at 20° C. (anhydrous) or 0.24 g/100 ml at 20° C. (dihydrate)] that tends to precipitate from solution. Similarly, strontium ions and sulfate ions or barium ions and sulfate ions tend to combine and precipitate. Thus, a problem with using water for common well treatments tends to be either an undesirably-high concentration of calcium, strontium, or barium ions or an undesirably-high concentration of sulfate ions.

Borates have the chemical formula $B(OR)_3$, where B=boron, O=oxygen, and R=hydrogen or any organic group. At higher pH ranges, e.g., 8 or above, a borate is capable of increasing the viscosity of an aqueous solution of a water-soluble polymeric material such as a galactomannan or a polyvinyl alcohol. Afterwards, if the pH is lowered, e.g., below 8, the observed effect on increasing the viscosity of the solution can be reversed to reduce or "break" the viscosity back toward its original lower viscosity. It is also well known that, at lower pH ranges, e.g., below 8, borate does not increase the viscosity of such a water-soluble polymeric material. This effect of borate and response to pH provides a commonly used technique for controlling the cross-linking of certain polymeric viscosity-increasing agents. The control of increasing the viscosity of such fluids and the subsequent "breaking" of the viscosity tends to be sensitive to several factors, including the particular borate concentration in the solution. Borate cross-linking may be undesirable in some well treatments, however, which may interfere with the desired chemistry for a particular well treatment. Thus, the presence of borates or the presence of unknown concentrations of borates is often undesired.

As used herein, a substantial concentration of sulfate ions is defined as being equal to or greater than 500 ppm; a substantial concentration of calcium or magnesium ions is defined as being equal to or greater than a combined total of 1,000 ppm; a substantial concentration of iron ions (ferrous and ferric) is defined as being equal to or greater than 5 ppm; a substantial concentration of borate is defined as being equal to or greater than 5 ppm.

One attempted solution has been to treat the water to remove some of the interfering ions. There are several existing methods of treating non-freshwater such as evaporative distillation and reverse osmosis. Both of these treatment methods remove the vast majority of TDS from the water. Removing excess ions by distillation or reverse osmosis is an expensive process. Of course, the costs of treating water are multiplied by the large volumes of water required for well treatments, especially for the volumes of water required for water-fracturing treatments.

SUMMARY OF THE INVENTION

The invention provides for a composition of a treatment fluid and method for treating a zone of a well.

In an embodiment, the composition includes at least: (i) an aqueous phase; (ii) at least 5 ppm iron ion in the aqueous phase; (iii) a source of at least 5 ppm iodide ion dissolved or to be dissolved in the aqueous phase; (iv) a water-soluble viscosity-increasing agent dissolved in the aqueous phase; and (v) a source of an oxidative breaker dissolved or to be dissolved in the aqueous phase.

In an embodiment, a method of treating a zone of a well includes at least the steps of: (a) forming a treatment fluid according to the invention; and (b) introducing the treatment fluid into the zone.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

BRIEF DESCRIPTION OF THE DRAWING

The accompanying drawing is incorporated into the specification to help illustrate examples according to the presently most-preferred embodiment of the invention.

FIG. 2 is a graph of a viscosity profile over time of a typical fracturing fluid including a crosslinked guar and an oxidizing breaker (sodium persulfate) in Duncan Tap Water ("DTW")

with varying amounts of potassium iodide. The viscosity is measured at 40 sec$^{-1}$ and at 150 degrees Fahrenheit.

FIG. 4 is a graph showing a comparison of a sample control without iron, one with iron(II), and one with iron(III). In a "Control" experiment, a 25 lb/Mgal of guar polymer was hydrated in 200 ml of deionized water. The pH of the solution was increased to 10 by adding about 5 μL of sodium hydroxide, 50 μL of persulfate breaker, and 100 μL of borate crosslinker. In an "Fe2" experiment, a 25 lb/Mgal of guar polymer was hydrated in 200 ml of a iron solution with a concentration of 25 mg/L of Fe2+. The pH of the solution was increased to 10 by adding about 10 μL of sodium hydroxide, 50 μL of persulfate breaker, and 100 μL of borate crosslinker. In a "Fe3" experiment, a 25 lb/Mgal of guar polymer was hydrated in 200 ml of a iron solution with a concentration of 25 mg/L of Fe3+. The pH of the solution was increased to 10 by adding about 10 μL of sodium hydroxide, 50 μL of persulfate breaker, and 100 μL of borate crosslinker. In each of these experiments, the viscosity of the solution was monitored in a TA instruments ARES G2 Rheometer at a shear rate of 40 s$^{-1}$ for 25 minutes while the temperature was increased from ambient to 63° C. at a heating rate of 4.5° C. per minute. A plot of the viscosity verses time is labeled "Control," "Fe2," and "Fe3" is shown in FIG. 4. A plot of the rise in temperature from ambient to 63° C. is also shown in FIG. 4.

DETAILED DESCRIPTION OF PRESENTLY PREFERRED EMBODIMENTS AND BEST MODE

General Definitions and Usages

As used herein, the words "comprise," "have," "include," and all grammatical variations thereof are each intended to have an open, non-limiting meaning that does not exclude additional elements or steps.

The terms in herein have their plain, ordinary meaning unless otherwise explicitly and clearly defined. If there is any conflict in the usages of a word or term in this specification and one or more patent(s) or other documents that may be incorporated herein by reference, the definitions that are consistent with this specification should be adopted.

As used herein, unless otherwise specified or unless the context otherwise clearly requires, the "source" of a chemical species in a composition, can be a substance that makes the chemical species chemically available immediately or it can be a substance that gradually or later releases the chemical species to become chemically available. For example, a source of a breaker can be a breaker that is immediately dissolved or a breaker that is in a solid form, such as encapsulated, or reacts to gradually release or later produce the breaker in a chemically available form.

As used herein, unless otherwise specified or unless the context otherwise clearly requires, the physical state or phase of a substance (or mixture of substances) and other physical properties are determined at a temperature of 77° F. (25° C.) and a pressure of 1 atmosphere (Standard Laboratory Conditions) under no shear.

As used herein, unless otherwise specified or unless the context otherwise clearly requires, a substance is considered to be "soluble" in a liquid if at least 2 grams of the substance can be dissolved in one liter of the liquid when tested at 77° F. and 1 atmosphere pressure for 2 hours and considered to be "insoluble" if less soluble than this.

As will be appreciated by a person of skill in the art, the hydratability, dispersability, or solubility of a substance in water can be dependent on the salinity, pH, or other substances in the water. Accordingly, the salinity, pH, and additive selection of the water can be modified to facilitate the hydratability, dispersability, or solubility of a substance in aqueous solution.

As used herein, unless otherwise specified or unless the context otherwise clearly requires, the apparent viscosity is measured with a Chandler HPHT viscometer with a B5X bob, rotating cup at a shear rate of 40 sec$^{-1}$ (or 40 1/s), starting at room temperature (about 20° C.) and pressure of 24 atmospheres of applied nitrogen. The temperature is ramped 4.5° C. per minute until a temperature of 66° C., and the temperature is maintained for at least two hours or until the resulting viscosity of the gel is below 10 cP. In certain cases, the viscosity was measured with TA Instruments Ares G2 rheometer with recessed bob and cup couette geometry starting at room temperature (about 20° C.) at a pressure of 1 atmosphere. The temperature is ramped 4.5° C. per minute until a temperature of 66° C., and the temperature is maintained for at least two hours or until the resulting viscosity of the gel is below 10 cP. For reference, the viscosity of pure water is about 1 cP.

As used herein, unless otherwise specified or unless the context otherwise clearly requires, a substance is considered to be a viscous fluid if it has an apparent viscosity greater than 10 cP.

As used herein, unless otherwise specified or unless the context otherwise clearly requires, the viscosity of a viscous fluid is considered to break or be broken if the viscosity is reduced to below 10 cp.

In the oil industry, the term "gel" is used broadly to refer to a fluid viscosified with a thickening or gelling agent, regardless of whether it meets the technical definition for the physical state of a gel. As used herein, unless otherwise specified or unless the context otherwise clearly requires, a substance referred to as a "gel" is subsumed by the concept of "fluid" if it is a pumpable fluid.

As used herein the term "design temperature" refers to an estimate or measurement of the actual temperature at the down hole environment at the time of the treatment. That is, design temperature takes into account not only the bottom hole static temperature ("BHST"), but also the effect of the temperature of the treatment fluid on the BHST during treatment. Because treatment fluids may be considerably cooler than BHST, the difference between the two temperatures can be quite large. Ultimately, if left undisturbed, a subterranean formation will return to the BHST.

As used herein, unless otherwise specified or unless the context otherwise clearly requires, any ratio or percentage means by weight.

As used herein, unless otherwise specified or unless the context otherwise clearly requires, the phrase "by weight of the water" means the weight of the water of the continuous phase of the fluid without the weight of any viscosity-increasing agent, dissolved salt, suspended particulate, or other materials or additives that may be present in the water.

As used herein, unless otherwise specified or unless the context otherwise clearly requires, any doubt regarding whether units are in U.S. or Imperial units, where there is any difference, U.S. units are intended herein. For example, "gal/Mgal" means U.S. gallons per thousand U.S. gallons.

As used herein, unless otherwise specified or unless the context otherwise clearly requires, the barrel is the unit of measure used in the US oil industry, wherein one barrel equals 42 U.S. gallons. Standards bodies such as the American Petroleum Institute (API) have adopted the convention that if oil is measured in oil barrels, it will be at 14.696 psi and 60° F., whereas if it is measured in cubic meters, it will be at 101.325 kPa and 15° C. (or in some cases 20° C.). The pressures are the same but the temperatures are different—60° F. is 15.56° C., 15° C. is 59° F., and 20° C. is 68° F. However, if all that is needed is to convert a volume in barrels to a volume in cubic meters without compensating for temperature differences, then 1 bbl equals 0.159 m$^3$.

The micrometer (μm) may sometimes referred to herein as a micron.

While compositions and methods are described in terms of "comprising," "containing," or "including" various components or steps, the compositions and methods also can "consist essentially of" or "consist of" the various components and steps. The indefinite articles "a" or "an", as used in the claims, are defined herein to mean one or more than one of the element that it introduces. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values.

Problem with Using Water from Non-Traditional Sources Having Iron

The use of non-traditional sources of water, such as flowback or produced water, in a well treatment fluid is desirable because it can be much less expensive than obtaining freshwater. However, using non-traditional sources of water can be problematic for various reasons, including that water from such sources tend to have dissolved iron. As used herein, unless otherwise specified or unless the context otherwise clearly requires, iron refers to any combination of ferric (iron (III)) and ferrous (iron (II)) ions.

Iron has been shown to be a substantial constituent of produced, flowback, and other nontraditional water sources that would be desirable to use in well treatment fluids such as fracturing fluids. Non-fresh water sources sometimes contain a substantial concentration of iron in the range of 5 ppm to 1,000 ppm. Typical iron concentrations in nontraditional sources of water are in the range of about 20 to about 300 ppm.

Substantial concentrations of iron can severely limit the use of a water source for well treatment fluids such as fracturing fluid. Such substantial concentrations of iron have been shown to have a major impact on the performance of a fracturing fluid. Iron tends to increase the rate of oxidation of a fracturing fluid when an oxidative breaker is used in the system. Although in some cases this can be factored into the composition of the treatment fluid, it is often a problem with using water from a nontraditional source such as produced water or flowback water. Without being limited by any theory, the presence of iron appears to catalyze a breaking mechanism that is dependent on free radical sources.

General Objective

A purpose of this invention is to address using produced waters with contamination with iron for well treatment fluids.

Well treatment fluids with borate are usually formed to have a high pH. It has been observed that in such treatment fluids with substantial concentrations of iron tend to break more quickly, and sometimes much more quickly than expected or desired.

In general, iron(II) compounds are soluble in water, whereas uncomplexed iron (III) compounds are soluble in acidic solution but precipitate above pH 4. Iron(III) compounds in water can be in form of iron halides or iron oxide (which is rust). But ion(III) can be dissolved under neutral or higher pH conditions by chelating. For example, catechol is present in crude oil, which can chelate with iron(III) to dissolve it.

The time required for uncomplexed iron(II) to undergo oxidation to the iron(III) state is dependent on many factors, the dominant being: pH; temperature; dissolved oxygen level; and the presence of other soluble ions. The lower the pH and temperature the longer the time required for completion of the oxidation reaction. Increasing dissolved oxygen decreases the time required for oxidation. For example, for a 0.90% by weight iron(II) solution at 21° C., oxidation at pH 8.0 occurs in just 30 seconds, at pH 7.0 in 1 hour, and pH 6.0 in 100 hours. The critical dissolved oxygen concentration is 2 mg/L. Below that ferrous iron oxidation occurs slowly.

Without being limited by any theory, it is presently believed the culprit causing undesirably fast breaking in certain treatment fluids is probably iron(II).

To deal with the fast breaking that can be undesirable in certain situations, according to the invention it has been shown that the inclusion of an iodide source can counteract this behavior. As shown here, the iodide source can be in the form of potassium iodide, however other iodide sources are contemplated. When using waters that are high in iron concentration, it is possible to include an iodide source, such as potassium iodide, in the fracturing fluid to counter the presence of the iron and delay the breaking.

The use of an iodide source in the aqueous phase of the fluid can inhibit the effect of the iron on the breaking rate. This can be done with a very low concentration of iodide, which is a relatively cheap method of counteracting these effects and obviates the need to removing the iron from the water before use in a treatment fluid that is to be broken with an oxidizing breaker.

Iron(III) can react with iodide to form free iodine and iron(II). Iron(II) can be oxidized with oxidizers to iron(III), that is, iron(II) catalyze persulfate oxidation to form sulfate radical at higher pH. Iron(II) can act as a sulfate radical scavenger at higher concentrations, which indicates there is an optimum concentration of iron(II) that leads to most effective degradation of the target contaminant. Without being limited by any theory, iodine is believed to be preventing or slowing the oxidation of polymer in the presence of iron and it may be helping to increase the concentration of iron(II), which may be competing for sulfate radicals.

Although removal of the iron from the water would also help with this problem, removal of iron is costly or even cost prohibitive. The addition of an iodide will allow for the effect of the iron to be neutralized without high cost implications.

This effect of the potassium iodide is different than in the use of potassium iodide in acidizing treatment fluids for acidizing treatments. This application of this invention is for the use of potassium iodide or other iodide to stabilize a viscosified fluid, such as a fracturing fluid, so that it can be made with water containing a high concentration of iron.

It is believed that iron(II) ion in a treatment fluid can be undesirable because it can catalyze the oxidative breaking of a viscosity-increasing agent, leading to breaking of the treatment fluid earlier than desired for a particular treatment, such as in a fracturing operation. Without being limited by any theory, it is presently believed that iodide ion interacts with the iron(II) ion, which reduces its availability to catalyze the oxidation of viscosity-increasing agent. Iron(III) is rust and should not be a problem. Iron(II) is presently believed to activate an oxidizer such as persulfate. Iodide is a reducing agent and will reduce iron(III) to iron(II), which should increase the rate of use of oxidizer. It is believed that the oxidizer is probably lost in this process and therefore little degradation is observed when iodine is present. In addition, iron(II) can act as a sulfate radical scavenger at higher concentrations, indicating that there is an optimum concentration of iron(II) that leads to most effective degradation of the polymer. Above certain concentration it will inhibit the breakage of polymer by competing for sulfate radical.

Physical State and Rheology

One of the purposes of identifying the physical state of a substance and measuring viscosity or other physical characteristics of a fluid is to establish whether it is pumpable. In the context of oil and gas production, the pumpability of a fluid is with particular reference to the ranges of physical conditions that may be encountered at a wellhead and with the types and sizes of pumps available to be used for pumping fluids into a well. Another purpose is to determine what the physical state of the substance and its physical properties will be during pumping through a wellbore and under other downhole conditions in the well, including over time and changing temperatures, pressures, and shear rates. For example, in some applications, a well fluid forms or becomes a higher viscosity fluid under downhole conditions that later is "broken" to a lower viscosity fluid.

As used herein, "phase" is used to refer to a substance having a chemical composition and physical state that is distinguishable from an adjacent phase of a substance having a different chemical composition or different physical state.

As used herein, a fluid is a substance that behaves as a fluid under standard laboratory conditions, that is, at 77° F. (25° C.) temperature and 1 atmosphere pressure, and at the higher temperatures and pressures usually occurring in subterranean formations.

Every fluid inherently has at least a continuous phase. A fluid can have more than one phase.

Preferably, the continuous phase of a well fluid is a liquid under standard laboratory conditions. For example, a well fluid can be in the form of be a suspension (solid particles dispersed in a liquid phase), an emulsion (liquid particles dispersed in another liquid phase), or a foam (a gas phase dispersed in liquid phase).

Water-Based and Oil-Based Fluids

As used herein, a water-based fluid means that water or an aqueous solution is the dominant material, that is, greater than 50% by weight, of the continuous phase of the substance.

In contrast, "oil-based" means that oil is the dominant material by weight of the continuous phase of the substance. In this context, the oil of an oil-based fluid can be any oil. In general, an oil is any substance that is liquid standard laboratory conditions, is hydrophobic, and soluble in organic solvents. Oils have a high carbon and hydrogen content and are relatively non-polar substances, for example, having a polarity of 3 or less on the Synder polarity index. This general definition includes classes such as petrochemical oils, vegetable oils, and many organic solvents. All oils can be traced back to organic sources.

Continuum Mechanics and Rheology

Continuum mechanics is a branch of mechanics that deals with the analysis of the kinematics and the mechanical behavior of materials modeled as a continuous mass on a large scale rather than as distinct particles. Fluid mechanics is a branch of continuum mechanics that studies the physics of continuous materials that take the shape of their container. Rheology is the study of the flow of matter: primarily in the liquid state, but also as "soft solids" or solids under conditions in which they respond with plastic flow rather than deforming elastically in response to an applied force. It applies to substances that have a complex structure, such as fluid suspensions, gels, etc. The flow of such substances cannot be fully characterized by a single value of viscosity, which varies with temperature, pressure, and other factors. For example, ketchup can have its viscosity reduced by shaking (or other forms of mechanical agitation) but water cannot.

Particulate

As used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand).

A particulate can be of solid or liquid particles. As used herein, however, unless the context otherwise requires, particulate refers to a solid particulate.

Fluids and Apparent Viscosity

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

Viscosity is a measure of the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

A Newtonian fluid (named after Isaac Newton) is a fluid for which stress versus strain rate curve is linear and passes through the origin. The constant of proportionality is known as the viscosity. Examples of Newtonian fluids include water and most gases. Newton's law of viscosity is an approximation that holds for some substances but not others.

Non-Newtonian fluids exhibit a more complicated relationship between shear stress and velocity gradient (i.e., shear rate) than simple linearity. Thus, there exist a number of forms of non-Newtonian fluids. Shear thickening fluids have an apparent viscosity that increases with increasing the rate of shear. Shear thinning fluids have a viscosity that decreases with increasing rate of shear. Thixotropic fluids become less viscous over time at a constant shear rate. Rheopectic fluids become more viscous over time at a constant sear rate. A Bingham plastic is a material that behaves as a solid at low stresses but flows as a viscous fluid at high stresses.

Most well fluids are non-Newtonian fluids. Accordingly, the apparent viscosity of a fluid applies only under a particular set of conditions including shear stress versus shear rate, which must be specified or understood from the context. In the oilfield and as used herein, unless the context otherwise requires it is understood that a reference to viscosity is actually a reference to an apparent viscosity. Apparent viscosity is commonly expressed in units of centipoise ("cP").

Like other physical properties, the viscosity of a Newtonian fluid or the apparent viscosity of a non-Newtonian fluid may be highly dependent on the physical conditions, primarily temperature and pressure. Accordingly, unless otherwise stated, the viscosity or apparent viscosity of a fluid is measured under Standard Laboratory Conditions.

There are numerous ways of measuring and modeling viscous properties, and new developments continue to be made. The methods depend on the type of fluid for which viscosity is being measured. A typical method for quality assurance or quality control (QA/QC) purposes uses a couette device, such as a Fann Model 35 or 50 viscometer or a Chandler 5550 HPHT viscometer, that measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

Foamed Fluids

A foamed fluid is fluid having a liquid external phase that includes a dispersion of undissolved gas bubbles that foam the liquid, usually with the aid of a chemical (a foaming agent) in the liquid phase to achieve stability.

Any suitable gas may be used for foaming, including nitrogen, carbon dioxide, air, or methane. A foamed treatment fluid may be desirable to, among other things, reduce the amount of fluid that is required in a water sensitive subterranean formation, to reduce fluid loss in the formation, or to provide enhanced proppant suspension. In examples of such embodiments, the gas may be present in the range of from about 5% to about 98% by volume of the treatment fluid, and more preferably in the range of from about 20% to about 80% by volume of the treatment fluid. The amount of gas to incorporate in the fluid may be affected by many factors including the viscosity of the fluid and the bottom hole temperatures and pressures involved in a particular application. One of ordinary skill in the art, with the benefit of this disclosure, will recognize how much gas, if any, to incorporate into a foamed treatment fluid.

Where it is desirable to foam a treatment fluid, surfactants such as HY-CLEAN (HC-2) surface-active suspending agent or AQF-2 additive, both commercially available from Halliburton Energy Services, Inc., of Duncan, Okla., may be used. Additional examples of foaming agents that may be used to foam and stabilize the treatment fluids include, but are not limited to, betaines, amine oxides, methyl ester sulfonates, alkylamidobetaines such as cocoamidopropyl betaine, alpha-olefin sulfonate, trimethyltallowammonium chloride, C8 to C22 alkylethoxylate sulfate and trimethylcocoammonium chloride. Other suitable foaming agents and foam stabilizing agents may be included as well, which will be known to those skilled in the art with the benefit of this disclosure.

Emulsions

An emulsion is a fluid including a dispersion of immiscible liquid particles in an external liquid phase. In addition, the proportion of the external and internal phases is above the solubility of either in the other. A chemical (an emulsifier or emulsifying agent) can be included to reduce the interfacial tension between the two immiscible liquids to help with stability against coalescing of the internal liquid phase.

An emulsion can be an oil-in-water (o/w) type or water-in-oil (w/o) type. A water-in-oil emulsion is sometimes referred to as an invert emulsion. In the context of an emulsion, a "water phase" refers to a phase of water or an aqueous solution and an "oil phase" refers to a phase of any non-polar organic liquid that is immiscible with water, such as petroleum, kerosene, or synthetic oil.

As used herein, an "emulsifier" refers to a substance that helps prevent the droplets of the dispersed phase of an emulsion from flocculating or coalescing in the emulsion.

An emulsifier can be or include a cationic, a zwitterionic, or a nonionic emulsifier.

Forming a Treatment Fluid

The treatment fluid may be prepared at the job site, prepared at a plant or facility prior to use, or certain components of the treatment fluid (e.g., the aqueous phase and the viscosity-increasing agent) may be pre-mixed prior to use and then transported to the job site. Certain components of the treatment fluid may be provided as a "dry mix" to be combined with a liquid or other components prior to or during introducing the treatment fluid into the subterranean formation.

Forming on the Fly

In certain embodiments, the preparation of these treatment fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Variations in Well Fluids Over Time

Unless the specific context otherwise requires, a well fluid or treatment fluid refers to the specific properties and composition of a fluid at the time the fluid is being introduced into a well. In addition, it should be understood that, during the course of a well operation such as drilling, cementing, completion, or intervention, or during a specific treatment, the specific properties and composition of a type of well fluid can be varied or several different types of well fluids can be used. For example, the compositions can be varied to adjust viscosity or elasticity of the well fluids to accommodate changes in the concentrations of particulate to be carried down hole. It can also be desirable to accommodate expected changes in temperatures encountered by the well fluids during the course of the treatment. By way of another example, it can be desirable to accommodate the longer duration that the first treatment fluid may need to maintain viscosity before breaking compared to the shorter duration that a later-introduced treatment fluid may need to maintain viscosity before breaking. Changes in concentration of a particulate, viscosity-increasing agent, breaker, or other additives in the various treatment fluids of a treatment operation can be made in stepped changes of concentrations or ramped changes of concentrations.

Composition of Treatment Fluid

According to an embodiment, a composition of a treatment fluid includes at least: (i) an aqueous phase; (ii) at least 5 ppm iron ion dissolved in the aqueous phase; (iii) a source of at least 5 ppm iodide ion to be dissolved in the aqueous phase; (iv) a water-soluble viscosity-increasing agent dissolved in the aqueous phase; and (v) a source of an oxidative breaker to be dissolved in the aqueous phase.

Aqueous Phase

The aqueous phase includes water. The water preferably is present in the treatment fluids suitable for use in the present invention in an amount at least sufficient to substantially hydrate the viscosity-increasing agent. In some embodiments, the aqueous phase, including the dissolved materials therein, may be present in the treatment fluids suitable for use in the present invention in an amount in the range from about 5% to 100% by volume of the treatment fluid.

Preferably, the water for use in the treatment fluid does not contain anything that would adversely interact with the other components used in accordance with this invention or with the subterranean formation.

The aqueous phase can include freshwater or non-freshwater. Non-freshwater sources of water can include surface water ranging from brackish water to seawater, brine, returned water (sometimes referred to as flowback water) from the delivery of a well fluid into a well, unused well fluid, and produced water. As used herein, brine refers to water having at least 40,000 mg/L total dissolved solids.

In some embodiments, the aqueous phase of the treatment fluid may comprise a brine. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, mixtures thereof, and the like. The brine chosen should be compatible with the formation and should have a sufficient density to provide the appropriate degree of well control. Additional salts may be added to a water source, e.g., to provide a brine, and a resulting treatment fluid, having a desired density. Brines, where used, may be of any weight.

Salts may optionally be included in the treatment fluids of the present invention for many purposes, including, for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid suitable for use in the present invention. Suitable salts include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Preferably, the continuous aqueous phase of the treatment fluid is a liquid. In addition, it is contemplated that the treatment fluid can include a particulate, can be foamed, or include an emulsion.

In an embodiment, the aqueous phase is the continuous phase of the treatment fluid. In an embodiment, the treatment fluid is a water-based fluid. In an embodiment, the aqueous phase is at least 10% by weight of the treatment fluid. Of course, the aqueous phase can be up to 100% of the treatment fluid.

In an embodiment, the aqueous phase comprises water selected from the group consisting of: flowback water, produced water, or any combination thereof.

The water can be from any suitable source provided that it is of adequate quality for use in the desired treatment and treatment fluid. For example, in an embodiment, the aqueous phase comprises water selected from the group consisting of: flowback water, produced water, or any combination thereof that is obtained from the same well as the well in which the treatment fluid is to be introduced.

In an embodiment, the pH of the aqueous phase is greater than 4.5. In an embodiment, the aqueous phase does not include hydrogen fluoride.

At Least 5 ppm Iron Ion Dissolved in the Aqueous Phase

In an embodiment, at least 50% of the concentration of the iron ion in the aqueous phase is from water selected from the group consisting of: flowback water, produced water, or any combination thereof.

In an embodiment, at least 20 ppm iron ion is dissolved in the aqueous phase. In an embodiment, less than 1,000 ppm iron ion is dissolved in the aqueous phase. Preferably, less than 300 ppm iron ion is dissolved in the aqueous phase.

A Source of at Least 5 ppm Iodide Ion to be Dissolved in the Aqueous Phase

In an embodiment, at the source of the iodide ion is dissolved in the aqueous phase of the treatment fluid prior to introducing the treatment fluid into the well. In another embodiment, the source of the iodide can be a solid that gradually dissolves or later releases the iodide ion. In an embodiment, the source of iodide ion is selected from the group consisting of iodine, alkali metal iodides, alkaline earth metal iodides, ammonium iodide, delete, and any combination thereof.

In an embodiment, the source of the iodide ion is in a concentration in the treatment fluid to provide iodide ion dissolved or to be dissolved in the aqueous phase in a concentration that is at least stoichiometrically equal to the concentration of the iron ion. Preferably, the source of the iodide ion is in a concentration in the treatment fluid to provide iodide ion dissolved or to be dissolved in the aqueous phase in a concentration that is at least 3 stoichiometric times the concentration of the iron ion. The source of the iodide ion can be in a concentration in the treatment fluid to provide iodide ion dissolved or to be dissolved in the aqueous phase in a concentration that is less than 5 stoichiometric times the concentration of the iron ion.

Water-Soluble Viscosity-Increasing Agent and Optional Cross-Linker

In an embodiment, the water-soluble viscosity-increasing agent is polymeric. Preferably, the polymeric viscosity-increasing agent is selected from the group consisting of: guar, xanthan, cellulose, lotus bean gum, fenugreek, starch, and other polysaccharide or derivatized polysaccharide, and any combination thereof.

In an embodiment, the polymeric viscosity-increasing agent is cross-linked. In an embodiment, the aqueous phase of the treatment fluid comprises a cross-linker for crosslinking of the polymeric viscosity-increasing agent. Preferably, the cross-linker for the cross-linked viscosity-increasing agent is selected from the group consisting of: zirconium, titanium, chromium, aluminum, zinc, copper, manganese, boron, antimony, and any combination thereof.

Oxidative Breaker

In an embodiment, the source of the oxidative breaker is dissolved in the aqueous phase of the treatment fluid prior to introducing the treatment fluid into the well. In another embodiment, the source of the oxidative breaker can be a solid that gradually dissolves or later releases the breaker.

In an embodiment, the oxidative breaker is selected from the group consisting of persulfates, azo compounds, and any combination thereof. Preferably, the oxidative breaker is one or more persulfates. Preferably, the oxidative breaker is selected from the group consisting of alkali metal persulfates. In an embodiment, the oxidative breaker is selected for having an oxidation potential of at least 0.2 eV.

Optional Proppant or Gravel

In an embodiment, the treatment fluid comprises a proppant or gravel.

Other Well Fluid Additives

A well fluid can contain additives that are commonly used in oil field applications, as known to those skilled in the art. These include, but are not necessarily limited to, brines, inorganic water-soluble salts, salt substitutes (such as trimethyl ammonium chloride), pH control additives, surfactants, breakers, breaker aids, oxygen scavengers, alcohols, scale inhibitors, corrosion inhibitors, hydrate inhibitors, fluid-loss control additives, oxidizers, chelating agents, water control agents (such as relative permeability modifiers), consolidating agents, proppant flowback control agents, conductivity enhancing agents, clay stabilizers, sulfide scavengers, fibers, nanoparticles, bactericides, and combinations thereof.

It should be understood, however, that in an embodiment the treatment fluid does not include hydraulic cement and the treatment fluid is not a hydraulic cement composition.

Treatment Fluid as Emulsion

If desired, the treatment fluids suitable for use in the present invention may be used in the form of an emulsion. An example of a suitable emulsion would comprise an aqueous base fluid comprising a viscosity-increasing agent that comprises a diutan or derivative, and a suitable hydrocarbon as another phase. In some embodiments, the emulsion may comprise approximately 30% of an aqueous base fluid and 70% of a suitable hydrocarbon. In some embodiments, the external phase of the emulsion would be aqueous. In certain embodiments, it may be desirable to use an emulsion to, inter alia, reduce fluid loss to the subterranean formation, or to provide enhanced particulate suspension. Other benefits and advantages to using emulsions in the methods of the present invention will be evident to one of ordinary skill in the art.

Treatment Fluid as Foamed

In some embodiments, the treatment fluids can be foamed (e.g., a liquid that comprises a gas such as nitrogen or carbon dioxide).

In certain embodiments, it may desirable that the treatment fluid is foamed to, inter alia, reduce the amount of treatment fluid that is required, e.g. in water sensitive subterranean formations, to reduce fluid loss to the subterranean formation, enhance flow back of fluids, or to provide enhanced particulate suspension. In addition, in certain embodiments where the treatment fluids suitable for use in the present invention are used for fluid diversion, it may be desirable that the treatment be foamed.

While various gases can be utilized for foaming the treatment fluids of this invention, nitrogen, carbon dioxide, and mixtures thereof are preferred. In examples of such embodiments, the gas may be present in a treatment fluid suitable for use in the present invention in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application.

Viscosity and Breaking

It should be understood that the operative principles of this invention can apply to helping to control the oxidative breaking of treatment fluids viscosified to have a viscosity of greater than about 10 cP.

In an embodiment, the viscosity of the aqueous phase is greater than 50 cP during the step of introducing the treatment fluid into the well. In such an embodiment, the proportions of the iron ion dissolved in the aqueous phase, the source of the iodide ion, the viscosity-increasing agent dissolved in the aqueous phase, and the source of the oxidative breaker are selected such that the viscosity of the aqueous phase of the treatment fluid does not break to less than 50 cP at the design temperature and design shear before the completion of the step of introducing into the well or treatment zone.

Introducing into a Well or Treatment Zone

As used herein, introducing "into a well" means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone. As used herein, "into a treatment zone" means into and through the wellhead and, additionally, through the wellbore and into the treatment zone.

Often the step of delivering a well fluid into a well is within a relatively short period after forming the well fluid, e.g., less within 30 minutes to one hour. More preferably, the step of delivering the well fluid is immediately after the step of forming the well fluid, which is "on the fly." It should be understood that the step of delivering the treatment fluid into the wellbore can advantageously include the use of one or more fluid pumps.

The treatment fluid may be provided and introduced into the subterranean formation in certain embodiments of the present invention by any means known in the art. In certain embodiments, the treatment fluid may be introduced into the subterranean formation by pumping the treatment fluid into a well bore that penetrates a portion of the subterranean formation.

Fracturing Treatment

In certain embodiments (e.g., fracturing operations), the treatment fluid may be introduced into the subterranean formation at or above a pressure sufficient to create or enhance one or more fractures in a portion of the subterranean formation. In an embodiment, the step of introducing comprises introducing under conditions for fracturing a treatment zone. The fluid is introduced into the treatment zone at a rate and pressure that are at least sufficient to fracture the zone.

In some embodiments, the treatment fluids suitable for use in the methods of the present invention may be placed in a subterranean formation utilizing a hydrajet tool. The hydrajet tool may be capable of increasing or modifying the velocity or direction of the flow of a fluid into a subterranean formation from the velocity or direction of the flow of that fluid down a well bore. One of the potential advantages of using a hydrajet tool is that a fluid may be introduced adjacent to and localized to specific areas of interest along the well bore without the use of mechanical or chemical barriers. Some examples of suitable hydrajet tools are described in U.S. Pat. Nos. 5,765,642, 5,494,103, and 5,361,856, the relevant portions of which are hereby incorporated by reference.

In some embodiments in which a hydrajet tool is used, the fluid(s) introduced through the hydrajet tool are introduced at a pressure sufficient to result in the creation of at least one new fracture in the formation. In one example of a hydrajetting operation carried out at an elevated pressure, a hydrajetting tool having at least one fluid jet forming nozzle is positioned adjacent to a formation to be fractured, and fluid is then jetted through the nozzle against the formation at a pressure sufficient to form a cavity, or slot therein to fracture the formation by stagnation pressure in the cavity. Because the jetted fluids would have to flow out of the slot in a direction generally opposite to the direction of the incoming jetted fluid, they are trapped in the slot and create a relatively high stagnation pressure at the tip of a cavity. This high stagnation pressure may cause a micro-fracture to be formed that extends a short distance into the formation. That micro-fracture may be further extended by pumping a fluid into the well bore to raise the ambient fluid pressure exerted on the formation while the formation is being hydrajetted. Such a fluid in the well bore will flow into the slot and fracture produced by the fluid jet and, if introduced into the well bore at a sufficient rate and pressure, may be used to extend the fracture an additional distance from the well bore into the formation.

Non-Fracturing Treatment

In an embodiment, the step of introducing is at a rate and pressure below the fracture pressure of the treatment zone. In an embodiment, the step of introducing comprises introducing under conditions for gravel packing the treatment zone.

In an embodiment, step of introducing into the portion of the well is at an estimated shear greater than 200/sec, or greater than 300/sec, or greater than 400/sec, or greater than 500/sec.

In some embodiments, placing the treatment fluid into the subterranean formation comprises placing the treatment fluid into a well bore penetrating the subterranean formation. The treatment fluid may be prepared at the job site, prepared at a plant or facility prior to use, or certain components of the treatment fluid (e.g., the base fluid and the viscosity-increasing agent) may be pre-mixed prior to use and then transported to the job site. Certain components of the treatment fluid may be provided as a "dry mix" to be combined with the base fluid or other components prior to or during introducing the treatment fluid into the subterranean formation. In certain embodiments, the treatment fluid may be placed into the subterranean formation by placing the treatment fluid into a well bore that penetrates a portion of the subterranean formation.

Non-Acidizing Treatment

In an embodiment, the treatment fluid is at a pH greater than 4.5 or the treatment fluid does not include hydrofluoric acid. In an embodiment, the methods of the invention have application in non-acidizing treatments.

Allowing Time for Breaking in the Well

In an embodiment, the treatment fluid is allowed to remain in the treatment zone for at least a sufficient time for the viscosity of the treatment fluid to break.

Flow Back Conditions

In an embodiment, the step of flowing back is within 24 hours of the step of introducing. In another embodiment, the step of flowing back is within 16 hours of the step of introducing.

Producing Hydrocarbon from Subterranean Formation

Preferably, after any such well treatment, a step of producing hydrocarbon from the subterranean formation is the desirable objective.

EXAMPLES

To facilitate a better understanding of the present invention, the following examples of certain aspects of some embodiments are given. In no way should the following examples be read to limit, or define, the entire scope of the invention.

In the examples, apparent viscosity was measured with a Chandler 5550 HPHT viscometer with B5X bob, rotating cup, 500 psi of applied nitrogen, at 40 $sec^{-1}$.

Figure 1:
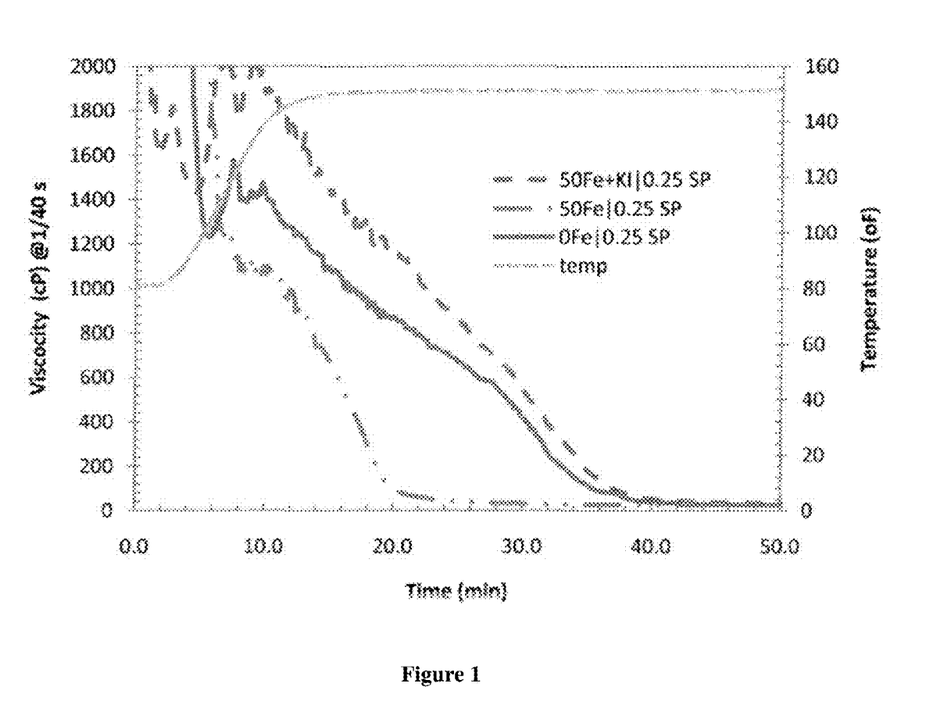
FIG. 1 is a graph of a viscosity profile over time of a typical fracturing fluid including a crosslinked guar at 25 lb/Mgal with an oxidizing breaker (sodium persuflate, identified in the graph as "SP") at 0.25 lb/Mgal in Duncan Tap Water ("DTW") and with varying amounts of iron(III) (identified in the graph by the chemical symbol "Fe") and potassium iodide (identified in the graph by the chemical symbols KI). The viscosity is measured at 40 $sec^{-1}$ and the temperature (identified as "temp" in the graph) ramped up from room temperature to 150 degrees Fahrenheit.

FIG. 1 is a graph of a viscosity profile over time of a typical fracturing fluid including a crosslinked guar at 25 lb/Mgal with an oxidizing breaker (sodium persuflate, identified in the graph as "SP") at 0.25 lb/Mgal in Duncan Tap Water ("DTW") and with varying amounts of iron(III) (identified in the graph by the chemical symbol "Fe") and potassium iodide (identified in the graph by the chemical symbols KI). The viscosity is measured at 40 $sec^{-1}$ and the temperature (identified as "temp" in the graph) ramped up from room temperature to 150 degrees Fahrenheit.

The fluid with 50 ppm of iron showed a dramatically increased breaking rate. With 50 ppm iron and potassium iodide (KI) included in the formulation, the resulting breakage rate decreases. The potassium iodide is used to stabilize the breakage from the oxidizing breaker sodium persulfate. The invention is the addition of potassium iodide to a crosslinked fracturing fluid made in water containing 5-300 ppm of iron to stabilize the free radical breaking of the viscosity.

Figure 2:
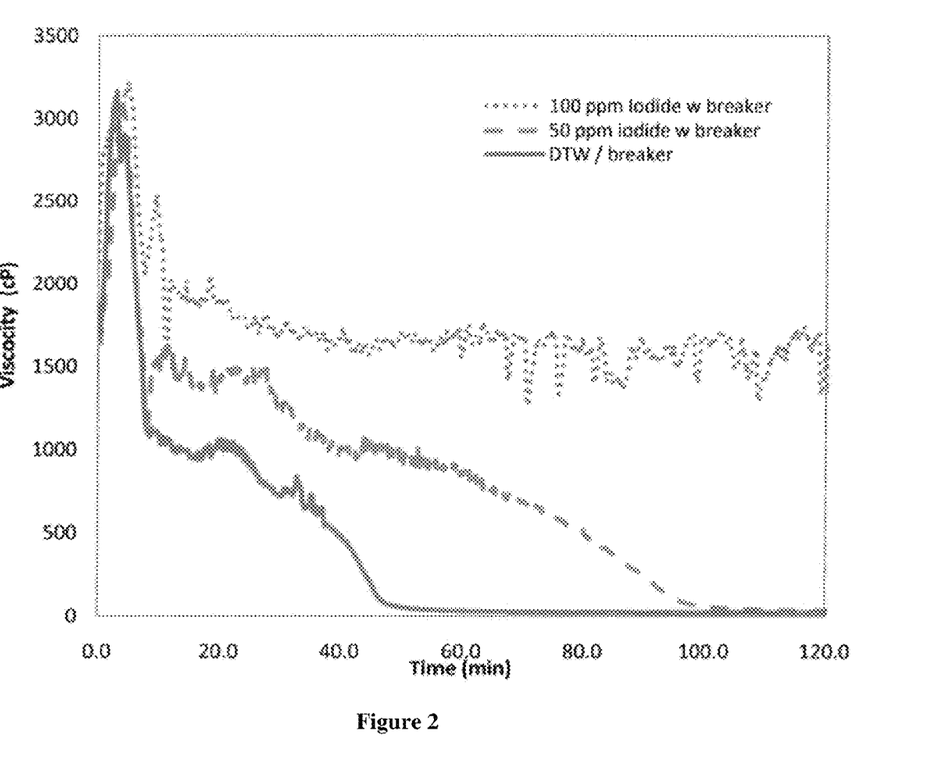

FIG. 2 is a graph of a viscosity profile over time of a typical fracturing fluid including a crosslinked guar and an oxidizing breaker (sodium persulfate) in Duncan Tap Water ("DTW") with varying amounts of potassium iodide as shown. The viscosity is measured at 40 $sec^{-1}$ and at 150 degrees Fahrenheit.

Figure 3:
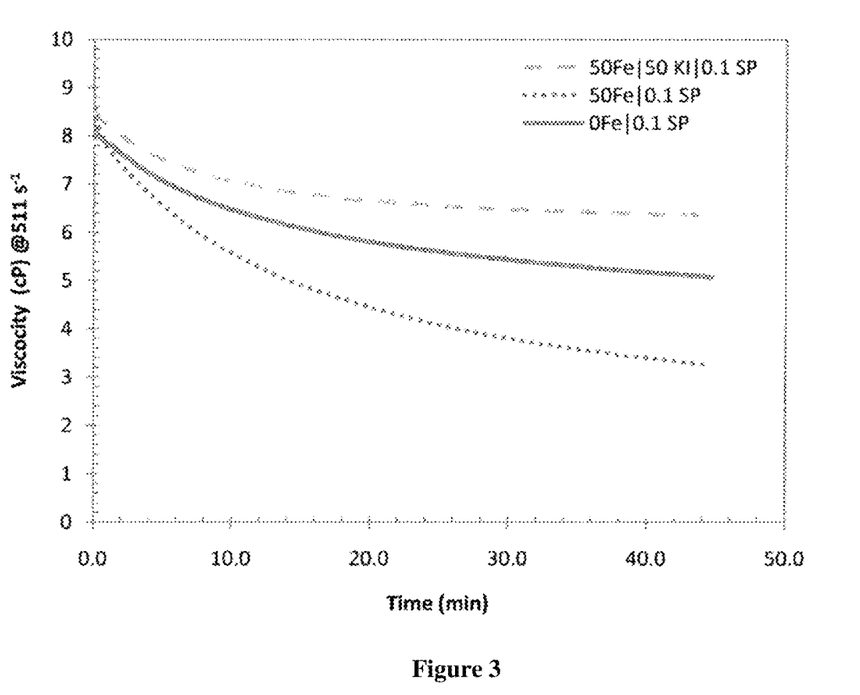
FIG. 3 is a graph showing the steady shear viscosity of a linear (non-crosslinked) guar polymer with 0.1 lb/Mgal of sodium persulfate in Duncan Tap Water and with varying amounts of iron(III) identified in the graph by the chemical symbol "Fe") and potassium iodide. Various amounts of iron (III) and potassium iodide were added to the system to show the stability afforded by the iodide to the fluid containing iron. The viscosity is measured at 511 sec$^{-1}$ and at 150 degrees Fahrenheit.

FIG. 3 is a graph showing the steady shear viscosity of a linear (non-crosslinked) guar polymer with 0.1 lb/Mgal of sodium persulfate in Duncan Tap Water and with varying amounts of iron(III) identified in the graph by the chemical symbol "Fe") and potassium iodide. Various amounts of iron (III) and potassium iodide were added to the system to show the stability afforded by the iodide to the fluid containing iron. The viscosity is measured at 511 $sec^{-1}$ and at 150 degrees Fahrenheit.

Figure 4:
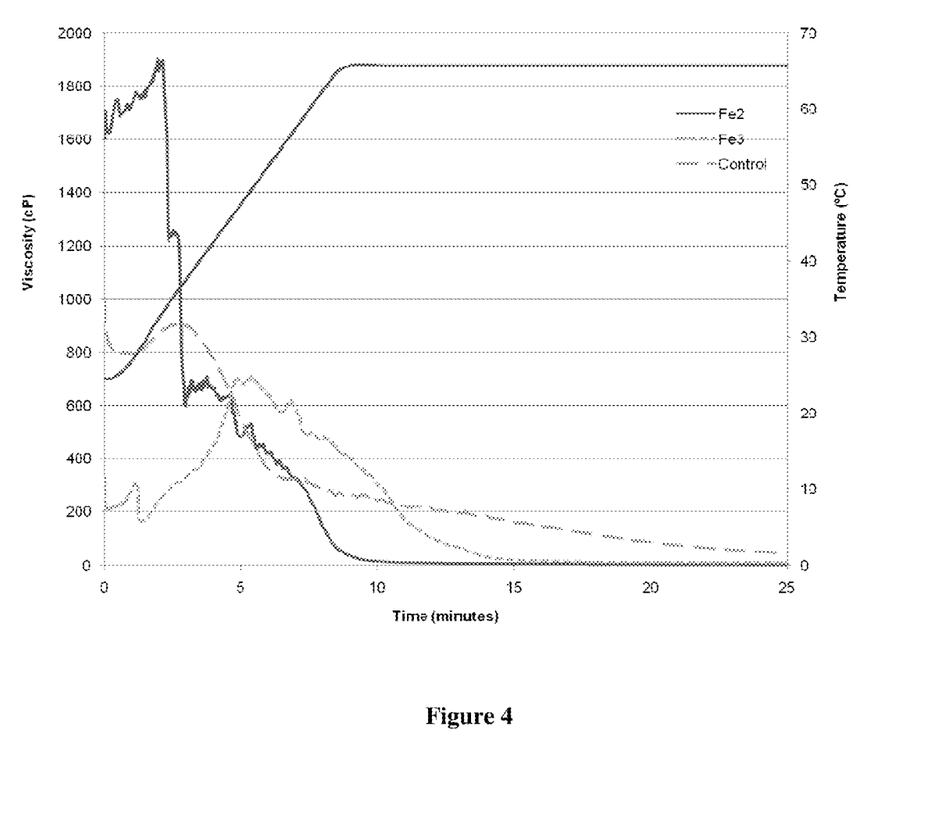

FIG. 4 is a graph showing a comparison of a sample control without any iron, one with iron(II), and one with iron(III). In a "Control" experiment, a 25 lb/Mgal of guar polymer was hydrated in 200 ml of deionized water. The pH of the solution was increased to 10 by adding about 5 µL of sodium hydroxide, 50 µL of persulfate breaker, and 100 µL of borate crosslinker. In an "Fe2" experiment, a 25 lb/Mgal of guar polymer was hydrated in 200 ml of a iron solution with a concentration of 25 mg/L of Fe2+. The pH of the solution was increased to 10 by adding about 10 µL of sodium hydroxide, 50 µL of persulfate breaker, and 100 µL of borate crosslinker. In a "Fe3" experiment, a 25 lb/Mgal of guar polymer was hydrated in 200 ml of a iron solution with a concentration of 25 mg/L of Fe3+. The pH of the solution was increased to 10 by adding about 10 µL of sodium hydroxide, 50 µL of persulfate breaker, and 100 µL of borate crosslinker. In each of these experiments, the viscosity of the solution was monitored in a TA instruments ARES G2 Rheometer at a shear rate of 40 $s^{-1}$ for 25 minutes while the temperature was increased from ambient to 63° C. at a heating rate of 4.5° C. per minute. A plot of the viscosity verses time is labeled "Control," "Fe2," and "Fe3" is shown in FIG. 4. A plot of the rise in temperature from ambient to 63° C. is also shown in FIG. 4.

CONCLUSION

Therefore, the present invention is well adapted to attain the ends and advantages mentioned as well as those that are inherent therein.

The particular embodiments disclosed are illustrative only, as the present invention may be modified and practiced in different but equivalent manners apparent to those skilled in the art having the benefit of the teachings herein. The various steps according to the disclosed elements or steps can be combined advantageously or practiced together in various combinations to increase the efficiency and benefits that can be obtained from the invention. Such variations and combinations are considered within the scope and spirit of the present invention.

The invention illustratively disclosed herein suitably may be practiced in the absence of any element or step that is not specifically disclosed or claimed.

Furthermore, no limitations are intended to the details of construction, composition, or design herein shown, other than as described in the claims.

What is claimed is:

1. A method of treating a treatment zone of a well, the method comprising the steps of:
   (a) forming a treatment fluid comprising:
      (i) an aqueous phase;
      (ii) at least 5 ppm iron ion dissolved in the aqueous phase, but less than 1,000 ppm iron ion is dissolved in the aqueous phase;
      (iii) a source of at least 5 ppm iodide ion to be dissolved in the aqueous phase, wherein the source of iodide ion is selected from the group consisting of iodine, alkali metal iodides, alkaline earth metal iodides, ammonium iodide, and any combination thereof;
      (iv) a water-soluble viscosity-increasing agent dissolved in the aqueous phase; and
      (v) a source of an oxidative breaker to be dissolved in the aqueous phase;
   wherein the source of the iodide ion is in a concentration in the treatment fluid to provide iodide ion in the aqueous phase in a concentration that is less than 5 stoichiometric times the concentration of the iron ion;
   wherein the pH of the aqueous phase is greater than 4.5; and
   (b) introducing the treatment fluid into the zone.

2. The method according to claim 1, wherein the aqueous phase comprises water selected from the group consisting of: flowback water, produced water, or any combination thereof that is obtained from the well.

3. The method according to claim 1, wherein the aqueous phase comprises at least 10% by weight of the treatment fluid.

4. The method according to claim 1, wherein the aqueous phase is the continuous phase of the treatment fluid.

5. The method according to claim 1, wherein at least 20 ppm iron ion is dissolved in the aqueous phase.

6. The method according to claim 1, wherein the source of the iodide ion is dissolved in the aqueous phase of the treatment fluid prior to introducing the treatment fluid into the well.

7. The method according to claim 1, wherein the source of the iodide ion is in a concentration in the treatment fluid to provide iodide ion in the aqueous phase in a concentration that is at least stoichiometrically equal to the concentration of the iron ion.

8. The method according to claim 1, wherein the source of the iodide ion is in a concentration in the treatment fluid to provide iodide ion in the aqueous phase in a concentration that is at least 3 stoichiometric times the concentration of the iron ion.

9. The method according to claim 1, wherein the water-soluble viscosity-increasing agent is polymeric.

10. The method according to claim 9, wherein the polymeric viscosity-increasing agent is selected from the group consisting of: guar, xanthan, cellulose, lotus bean gum, fenugreek, starch, and other polysaccharide or derivatized polysaccharide, and any combination thereof.

11. The method according to claim 9, wherein aqueous phase of the treatment fluid comprises a cross-linker for the polymeric viscosity-increasing agent.

12. The method according to claim 11, wherein the cross-linker is selected from the group consisting of: zirconium, titanium, chromium, aluminum, zinc, copper, manganese, boron, antimony, and any combination thereof.

13. The method according to claim 1, wherein the source of the oxidative breaker is dissolved in the aqueous phase of the treatment fluid prior to introducing the treatment fluid into the well.

14. The method according to claim 1, wherein the oxidative breaker is selected for having an oxidation potential of at least 0.2 eV.

15. The method according to claim 1, wherein the oxidative breaker is selected from the group consisting of persulfates, azo compounds, and any combination thereof.

16. The method according to claim 1, wherein the treatment fluid comprises a proppant.

17. The method according to claim 1, wherein the treatment fluid is introduced into the well at a rate and pressure that are at least sufficient to fracture the zone.

* * * * *